United States Patent Office 3,532,537
Patented Oct. 6, 1970

3,532,537
SILOXANE RUBBER
Hugh D. Richards, Glamorgan, Wales, assignor to Midland Silicones Limited, Reading, Berkshire, England
No Drawing. Filed Feb. 27, 1968, Ser. No. 708,507
Claims priority, application Great Britain, Mar. 3, 1967, 10,243/67
Int. Cl. B32b *15/08;* B44d *1/34*
U.S. Cl. 117—132      10 Claims

ABSTRACT OF THE DISCLOSURE

The adhesion of silicone rubber stocks to metal substrates can be controlled by including in the stocks a phenyl substituted siloxane fluid.

---

This invention relates to a method for controlling the adhesion of a silicone rubber layer on a metal substrate.

The application of silicone rubbers to metal and other substrates to form thereon protective and/or electrically insulating coverings has for many years been known and employed on a commercial scale. One particularly important aspect of this general application lies in the use of silicone rubbers as insulation for electrical conductors, for example, in cables wherein the silicone ruber may form all or part only of the insulating barrier. Although the electrical properties of silicone rubber make it admirably suitable for use in this manner, it is often found in those cases where the rubber-forming composition is applied directly to the metal conductor, for example by an extrusion technique, that the vulcanized rubber sheath has a tendency to adhere firmly to the conductor. This adhesion represents a significant disadvantage in this application of silicone rubbers in that it makes for difficulty in the subsequent stripping of portions of the sheath from the conductor when this becomes necessary for example during splicing operations.

We have now found that the above recited disadvantage can be overcome if there is incorporated into the silicone elastomer-forming composition prior to vulcanization a liquid organopolysiloxane in which at least some of the organic substituents are phenyl radicals. We have also unexpectedly found that the incorporation of the phenyl-containing organopolysiloxane may effect a significant improvement in the electric strength and resistivity properties of the vulcanized rubber.

Accordingly, this invention provides a process for the manufacture of a metal article having thereon a layer of a silicone rubber which comprises (1) applying to a metal substrate an elastomer-forming composition consisting essentially of (a) a polydiorganosiloxane gum, (b) a filler and (c) a liquid organopolysiloxane in which at least 5 percent of the total organic substituents are phenyl radicals and (2) thereafter vulcanizing the applied composition.

The invention also includes a silicone rubber coated metal, particularly an electrical conductor, when produced by the process.

As the polydiorganosiloxane gum (a), there is employed a high viscosity siloxane polymer which is convertible to the solid elastic state. Such materials and methods for their preparation are well known in the silicone-rubber art. The siloxane polymers (a) preferably have a viscosity in excess of about 1,000,000 cs. at 25° C. The silicon-bonded organic radicals present in the polydiorganosiloxane gum can be monovalent hydrocarbon radicals, for example methyl, ethyl, propyl, octadecyl, phenyl, benzyl and tolyl radicals and monovalent substituted hydrocarbon radicals, for example halogenated hydrocarbon radicals such as chlorophenyl and trifluoropropyl and cyanoalkyl radicals. Preferaby, at least 50 percent of the organic substituents are methyl radicals, any remaining substituents being selected from phenyl radicals, trifluoropropyl radicals and vinyl radicals. Any vinyl radicals present should preferably amount to less than 1 percent of the total organic radicals.

Examples of preferred polydiorganosiloxanes for use in this invention therefore include polydimethylsiloxanes, copolymers containing dimethylsiloxane units and methylvinylsiloxane units, copolymers containing dimethylsiloxane units, phenylmethylsiloxane units and methylvinylsiloxane units and copolymers of dimethylsiloxane units, diphenylsiloxane units and methyltrifluoropropylsiloxane units. Polydiorganosiloxane gums which are copolymers of methylvinylsiloxane units and dimethylsiloxane units are most preferred. If desired, the polydiorganosiloxane gum can be end-stopped with triorganosiloxy units such as trimethylsiloxy units or dimethylvinylsiloxy units.

The compositions employed according to this invention contain a filler (b) which can comprise any organic or inorganic material suitable for inclusion in silicon elastomer-forming compositions to modify the physical properties of the vulcanized elastomer. Any one or more of the fillers commonly employed in the fabrication of silicone elastomers can be used. Typical fillers include fume silicas, precipitated silicas, diatomaceous earth, crushed quartz, titanium dioxide, zinc oxide, calcium carbonate, zirconium silicate and magnesium oxide. Preferably, the filler component of the elastomer-forming composition comprises both a reinforcing filler and a semi- or non-reinforcing filler, for example, both a reinforcing silica and calcium carbonate.

The quantity of filler materials present in the compositions can vary widely depending, for example, on the physical properties desired in the finished elastomer. In general, however, and particularly where the elastomer-forming composition is destined for use in the manufacture of insulated electric cables, the quantity of filler (b) employed will fall within the range from 10 to 150 parts by weight based on 100 parts by weight of the polydiorganosiloxane (a).

The liquid organopolysiloxane (c) is one in which at least 5 percent of the total organic radicals are phenyl radicals, any remaining radicals comprising mainly aromatic radicals and saturated aliphatic hydrocarbon radicals such as methyl, ethyl, propyl, dodecyl, octadecyl and tolyl radicals. Minor proportions of substituted hydrocarbon radicals or unsaturated hydrocarbon radicals, for example, chloromethyl radicals and vinyl radicals can be present in the liquid organopolysiloxane (c). Preferably, however, any vinyl radicals present comprise less than 2.5 percent of the total number of organic radicals and the most preferred liquid organopolysiloxanes are the polydiorganosiloxanes having a viscosity in the range from 50 to 50,000 cs. at 25° C. and in which the organic radicals comprise methyl radicals and phenyl radicals. Examples of the preferred liquid organopolysiloxanes (c) are polymethylphenylsiloxanes, copolymers of phenylmethylsiloxane with dimethylsiloxane, copolymers of diphenylsiloxane and dimethylsiloxane and copolymers of those siloxanes with end-stopping units such as trimethylsiloxy units and methyldiphenylsiloxy units.

The proportion of the liquid organopolysiloxane employed in the elastomer-forming composition is not narrowly critical. As little as 0.5 percent by weight of the liquid organopolysiloxane based on the total weight of the gum (a) and filler (b) will normally effect some improvement in the electrical properties of the elastomer and the decrease its adherence to a metal substrate. A large excess, that is more than 10 percent by weight, of the organopolysiloxane is best avoided, however, as this may interfere with the ability of the composition to vulcanize satisfactorily. Preferably, we prefer to employ from 1 to 5 percent by weight of the liquid organopolysiloxane based on the total weight of the polydiorganosiloxane gum (a) and the filler (b).

Vulcanization of the elastomer forming compositions in accordance with the process of this invention can be effected by any of the conventional techniques, for example, by the application of high energy radiation or by the incorporation of one or more vulcanization accelerators. Preferably, the compositions are vulcanized by the incorporation therein of an organic peroxide or perester and the subsequent application of heat. Organic peroxides which are suitable for use with silicone elastomer-forming compositions are well known and include, for example, benzoyl peroxide, tertiary butyl peracetate, dicumyl peroxide, tertiary butyl cumyl peroxide, 2,5-ditertiary butyl peroxy-2,5-dimethylhexane and 2,4-dichlorobenzoyl peroxide, the latter being the most preferred.

Other additives such as pigments and heat-stability additives can also be incorporated in the compositions employed herein if desired.

Application of the elastomer-forming composition to the metal substrate can be carried out by any suitable technique. The process of this invention is particularly suitable for use in the application of silicone rubber insulation to electrical conductors, for example, of copper or of tinned copper, in the manufacture of electric cables. For such an application the layer of the elastomer-forming composition is normally applied by an extrusion of the composition over the conductor, the composition thereafter being vulcanized by heat or by high energy radiation. The process of this invention is also applicable where it is desired to apply to a metal surface a layer of a vulcanized silicone elastomer which has a minimum of adhesion thereto, for example, as in the making of elastomeric moulds.

The following examples in which the parts are expressed by weight illustrate the invention.

EXAMPLE 1

An elastomer-forming composition was prepared by compounding together on a rubber mill the following ingredients:

100 parts of a copolymeric gum containing 99.84 mol percent of dimethylsiloxane and 0.16 mol percent of methylvinylsiloxane,
33 parts of a fume silica having a surface area to weight ratio of approximately 300 m.$^2$/g.,
20 parts of calcium carbonate,
5 parts of a diatomaceous earth,
12 parts of a hydroxylated dimethylpolysiloxane having a viscosity of about 40 cs. at 25° C.,
1.9 parts of a 40% by weight dispersion of 2,4-dichlorobenzoyl peroxide in dimethylsiloxane fluid, and
2 parts of a polymer composed of phenylmethylsiloxane units end-stopped with trimethylsiloxy units and having a viscosity of 110 cs. at 25° C.

A homogeneous mixture was prepared on the mill and the composition was applied by extrusion over a tinned copper conductor to give a close-fitting cylindrical sheath thereon having a wall thickness of 0.020 inch. The coated conductor was then passed through a continuous vulcanization tube heated by 100 lb./in.$^2$ steam to effect vulcanization of the sheath, the time of residence in the tube being 40 seconds.

On cooling the coated conductor after vulcanization, it was found that the rubber sheath did not adhere to the conductor and could readily be stripped from it. A sample of the coated conductor was then placed in an oven at 170° C. for a period of one hour. The sample was examined after this time and the sheath was still free of adhesion to the metal. The test was repeated on a sample of the cable which had been stored at room temperature for 30 days and the results were the same as above.

The experiment was repeated employing an identical composition except that the liquid phenyl-containing organopolysiloxane was omitted. Some adhesion of the sheath to the conductor was obtained after the initial cure. After exposure of the coated conductor to a temperature of 170° C. for one hour, considerable adhesion of the rubber to the conductor was found to have occurred.

The electrical properties of samples of the coated conductors prepared with and without the liquid phenyl-containing organopolysiloxane additive were measured both following the initial steam cure and a further curing step consisting of exposure to a temperature of 200° C. for 10 days. The measurements were carried out on a sample of cable 25 feet long which was coiled and immersed in water at 25° C. for 18 hours, the immersion being complete apart from short portions brought up through the surface of the water to which the test apparatus could be connected. At the end of this period the resistance was measured between the conductor in the cable and an electrode placed in the water using an applied voltage of 500 v. D.C. This insulation resistance was then expressed as megohms per 1000 yards.

Immediately following the above test and while the cable was still immersed the breakdown voltage of the insulation was measured by the application of a continuously rising voltage (1 kv. per second) between the conductor and an electrode placed in the water, the voltage at which breakdown of the insulation occurred being expressed in kilovolts. The results obtained are given in the following table.

|  | After Initial Cure | | After 10 days at 200° C. | |
| --- | --- | --- | --- | --- |
|  | Insulation resistance | Breakdown | Insulation resistance | Breakdown |
| With additive | 3,000 | 6.5 | 5,830 | 8.0 |
| Without additive | 4,670 | 2.0 | 1,250 | 5.5 |

EXAMPLE 2

An insulated cable was prepared by extruding over a tinned copper conductor a composition identical with that employed in Example 1 except that the liquid phenyl-containing organopolysiloxane was in this case a copolymer having a viscosity of 500 cs. at 25° C. and comprising approximately equimolar percentages of phenylmethylsiloxane units and dimethylsiloxane units and end-stopped with trimethylsiloxy units.

After curing in a continuous vulcanization tube employing the conditions described in Example 1, it was found that the rubber did not adhere to the conductor and could be readily removed therefrom.

The electrical properties were measured in the manner described in Example 1 and values of insulation resistance and breakdown voltage of 2770 megohms per 1000 yards and 8.0 kv. respectively were obtained. After a further 10 days cure at 200° C., the cable sheath exhibited an insulation resistance of 6670 megohms per 1000 yards and a breakdown voltage of 9.5 kv.

EXAMPLE 3

Equivalent results were achieved when Example 1 was repeated employing 1 part of a polydiphenylsiloxane endblocked with trimethylsiloxane of 500 cs. viscosity at 25° C. or 5 parts of a phenyldimethylsiloxane endblocked copolymer of 25 mol percent diphenylsiloxane units and 75 mol percent dimethylsiloxane units having a viscosity of 40,000 cs. at 25° C. in place of the 2 parts phenylmethylsiloxane endblocked with trimethylsiloxane units.

EXAMPLE 4

Equivalent results were achieved when Example 2 was repeated employing dimethylpolysiloxane gum, 3,3,3-trifluoropropylmethylsiloxane gum, and a copolymeric gum containing 75 mol percent dimethylsiloxane units, 24 mol percent phenylmethylsiloxane units and 1 mol percent methylvinylsiloxane units along the chain and endblocked with vinyldimethylsiloxane units.

That which is claimed is:

1. A process for coating a metal article with a layer of a silicone rubber which comprises applying to a metal substrate an elastomer-forming composition consisting essentially of (a) 100 parts by weight of a diorganosiloxane gum, (b) 10 to 150 parts by weight of a filler and (c) 0.5 to 10 parts by weight of a liquid organopolysiloxane in which at least 5 percent of the total organic substituents are phenyl radicals and thereafter vulcanizing the applied composition.

2. A process as claimed in claim 1 wherein the dionganosiloxane gum is a copolymer containing dimethylsiloxane units and methylvinylsiloxane units.

3. A process as claimed in claim 1 wherein the filler consists of a mixture of a reinforcing filler and a semi- or non-reinforcing filler.

4. A process as claimed in claim 3 wherein the filler is a mixture of reinforcing silica and calcium carbonate.

5. A process as claimed in claim 1 wherein the liquid organopolysiloxane (c) is a polymethylphenylsiloxane.

6. A process as claimed in claim 1 wherein the liquid organopolysiloxane (c) is a copolymer containing dimethylsiloxane units together with phenylmethylsiloxane units, diphenylsiloxane units or both phenylmethylsiloxane and diphenylsiloxane units.

7. A process as claimed in claim 1 wherein the liquid organopolysiloxane has a viscosity in the range from 50 to 50,000 cs. at 25° C.

8. A process as claimed in claim 1 wherein there is also present in the elastomer-forming composition an organic peroxide or per-ester.

9. A process as claimed in claim 8 wherein the organic peroxide is 2,4-dichlorobenzoyl peroxide.

10. A process as claimed in claim 7 wherein the liquid organopolysiloxane (c) is employed in a proportion of from 1 to 5 parts by weight.

References Cited

UNITED STATES PATENTS

| | | | |
|---|---|---|---|
| 2,442,196 | 5/1948 | Loggeshall | 117—161 |
| 2,934,235 | 4/1960 | Maneri | 117—161 |
| 2,996,479 | 8/1961 | Sterman | 117—232 |
| 3,002,946 | 10/1961 | Thomas | 117—132 |
| 3,020,260 | 2/1962 | Nelson | 117—161 |
| 3,021,292 | 2/1962 | Hurd | 117—232 |
| 3,061,565 | 10/1962 | Collings | 260—29.1 |
| 3,079,281 | 2/1963 | Dexter | 117—132 |
| 3,231,532 | 1/1966 | Modic | 117—132 |
| 3,308,079 | 3/1967 | Haenni | 117—132 |
| 3,308,080 | 3/1967 | Haenni | 117—132 |

WILLIAM D. MARTIN, Primary Examiner

W. R. TRENOR, Assistant Examiner

U.S. Cl. X.R.

260—29.1